United States Patent
Irle et al.

(10) Patent No.: US 11,371,826 B2
(45) Date of Patent: Jun. 28, 2022

(54) DEVICE FOR DETERMINING AN ANGLE OF ROTATION AND/OR A TORQUE, AND METHOD FOR OPERATING THE DEVICE

(71) Applicant: HELLA GMBH & CO. KGAA, Lippstadt (DE)

(72) Inventors: Henning Irle, Lippstadt (DE); Fabian Utermoehlen, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 17 days.

(21) Appl. No.: 17/034,921

(22) Filed: Sep. 28, 2020

(65) Prior Publication Data
US 2021/0010793 A1    Jan. 14, 2021

Related U.S. Application Data

(63) Continuation of application No. PCT/EP2019/055995, filed on Mar. 11, 2019.

(30) Foreign Application Priority Data

Mar. 28, 2018 (DE) ..................... 10 2018 107 416.6

(51) Int. Cl.
*G01B 7/30* (2006.01)
*G01C 15/00* (2006.01)
(Continued)

(52) U.S. Cl.
CPC .............. *G01B 7/30* (2013.01); *G01B 7/003* (2013.01); *G01C 15/006* (2013.01); *G01D 5/20* (2013.01);
(Continued)

(58) Field of Classification Search
None
See application file for complete search history.

(56) References Cited

U.S. PATENT DOCUMENTS

| 8,116,935 B2 | 2/2012 | Kim |
| 8,138,753 B2 | 3/2012 | Eberl et al. |

(Continued)

FOREIGN PATENT DOCUMENTS

| DE | 102006043283 A1 | 3/2008 |
| DE | 102009041918 B4 | 8/2013 |

(Continued)

OTHER PUBLICATIONS

International Search Report dated Jul. 2, 2019 in corresponding application PCT/EP2019/055995.

*Primary Examiner* — Jermele M Hollington
*Assistant Examiner* — Suresh K Rajaputra
(74) *Attorney, Agent, or Firm* — Muncy, Geissler, Olds & Lowe, P.C.

(57) ABSTRACT

A device for determining an angle of rotation and/or a torque of a rotating part, having at least one angle detector for detecting an angular position of the rotating part relative to a reference position and at least one indexer for indexing at a 360° rotation of the rotating part relative to the reference position, the angle detector having a rotor connected in a non-rotatable manner to the rotating part with a base body for attachment to the rotating part and a plurality of vanes extending radially outwardly from the base body. At least one of the vanes of the rotor have a marker detectable by means of the indexer.

10 Claims, 3 Drawing Sheets

(51) Int. Cl.
  *G01B 7/00* (2006.01)
  *G01D 5/20* (2006.01)
  *G01D 5/24* (2006.01)
  *G01L 3/10* (2006.01)
  *G01L 5/22* (2006.01)
(52) U.S. Cl.
  CPC ............... *G01D 5/24* (2013.01); *G01L 3/105*
    (2013.01); *G01L 5/221* (2013.01)

(56) References Cited

U.S. PATENT DOCUMENTS

2001/0004849 A1* 6/2001 Jin .................... G01D 5/2451
  73/862.331
2009/0256556 A1* 10/2009 Eberl .................... F02K 3/06
  324/207.25
2017/0353133 A1 12/2017 Exner et al.
2021/0010881 A1* 1/2021 Irle .................... G01L 3/109

FOREIGN PATENT DOCUMENTS

| DE | 102015111315 A1 | 1/2017 |
| DE | 102016110085 A1 | 12/2017 |
| EP | 2383558 A1 | 11/2011 |
| FR | 3027103 A1 | 4/2016 |
| JP | 2014126455 A | 7/2014 |

\* cited by examiner

DEVICE FOR DETERMINING AN ANGLE OF ROTATION AND/OR A TORQUE, AND METHOD FOR OPERATING THE DEVICE

This nonprovisional application is a continuation of International Application No. PCT/EP2019/055995, which was filed on Mar. 11, 2019, and which claims priority to German Patent Application No. 10 2018 107 416.6, which was filed in Germany on Mar. 28, 2018, and which are both herein incorporated by reference.

BACKGROUND OF THE INVENTION

Field of the Invention

The present invention relates to a device for determining an angle of rotation and/or a torque of a rotating part, comprising at least one angle detector for detecting an angular position of the rotating part relative to a reference position and at least one indexer for indexing at a predetermined rotation, preferably a 360° rotation, of the rotating member relative to the reference position. The invention further relates to a method for operating the device according to the invention.

DESCRIPTION OF THE BACKGROUND ART

Such devices for determining an angle of rotation and/or a torque of a rotating part and methods for their operation are already known from the prior art in numerous design variants.

For example, EP 2 383 558 A1 discloses an inductive angle sensor for determining torque and relative angular position with respect to a reference position, comprising means for detecting angles and differential angles as well as means for indexing when passing through the reference position with a permanent magnet and a Hall sensor. In order to create an inexpensive and compactly producible torque sensor with angle determination and indexing, it is proposed that the Hall sensor be assigned a flux guide plate which, in the reference position, guides the flux of the permanent magnet to the Hall sensor.

SUMMARY OF THE INVENTION

It is therefore an object of the present invention to provide a device for determining an angle of rotation and/or a torque of a rotating part and a method for its operation.

This object is achieved by a device for determining an angle of rotation and/or a torque of a rotating part, in which at least one of the vanes of the rotor of the angle detector has a marker detectable via an indexer. Furthermore, this object is achieved by a method for operating such a device, which, as a function of the detection of the marker detectable by means of the indexer in an evaluation unit, a predetermined rotation, preferably a 360° rotation, of the rotating part relative to the reference position is determined.

A significant advantage of the invention for determining an angle of rotation and/or a torque of a rotating member is in particular that the structure of the inventive device is simplified in terms of construction and circuitry. The rotor of the angle detector for detecting an angular position of the rotating part relative to a reference position is also used for indexing during a predetermined rotation, preferably a 360° rotation, of the rotating part relative to the reference position by means of the indexer. Correspondingly, components can be saved, so that the construction of the device according to the invention is simpler and therefore more cost-effective. In addition, the device according to the invention can be implemented in a more space-saving and thus more compact manner.

In principle, the type, shape, material, dimensions, arrangement and number of the vanes of the rotor can be freely selected within wide, suitable limits. For example, it is conceivable that a plurality of vanes of the rotor have a marker that can be detected by means of the indexer. Advantageously, only a single vane has a marker that can be detected by means of the indexer. As a result, one-to-one indexing is implemented in a simple manner.

The angle detector and the indexer can also be freely selected within wide suitable limits in terms of type, mode of operation, shape, material, dimensions, arrangement and number. Accordingly, the invention can advantageously be used in a large number of different applications.

An advantageous development of the device according to the invention provides that the angle detector is designed as an inductive and/or capacitive and/or magnetic and/or optical sensor. The aforementioned sensors are tried and tested sensors that are available in a large number of designs. For example, it is conceivable that sensors that are different from one another, that is to say sensor principles that are different from one another, are used simultaneously according to the invention. On the one hand, this results in redundancy. On the other hand, undesired interaction between several sensors can be effectively prevented.

The same applies to another advantageous further development of the device according to the invention, according to which the indexer is designed as an inductive and/or capacitive and/or magnetic and/or optical sensor.

Correspondingly, for example, the use of an angle detector that operates according to a first sensor principle and the use of an indexer that operates according to a second sensor principle that is different from the first sensor principle enables an effective prevention of undesired interaction between the angle detector on the one hand and the indexer on the other.

A particularly advantageous development of the device according to the invention provides that in a detection area of the indexer, a single vane has an opening delimited by a circumferential edge or all vanes except for a single vane have an opening delimited by a circumferential edge. In this way, the device according to the invention can be implemented particularly easily. For example, the angle detector can be designed as an inductive sensor and the indexer as a capacitive sensor and a single vane can have an opening delimited by a circumferential edge or all vanes except for a single vane can have an opening delimited by a circumferential edge.

A further advantageous development of the device according to the invention provides that a single vane extends radially further outward from the base body than the other vanes into a detection area of the indexer or that all vanes except a single vane extend radially further outward from the base body than the single vane into a detection area of the indexer.

On the one hand, this indicates a possible alternative to the aforementioned embodiment of the device according to the invention. On the other hand, with a plurality of indexer, this embodiment of the device according to the invention can be combined, for example, with the aforementioned embodiment. This results in redundancy on the side of the at least one indexer. For example, the angle detector can be designed as an inductive sensor and the indexer as an optical sensor and a single vane can extend radially further outward from the basic body than the other vanes or all vanes except for one single vane can extend radially further outward from the base body than the single vane.

Another advantageous development of the device according to the invention provides that the angle detector and the indexer are each designed as an inductive sensor and that a stator of the indexer has at least one sensor coil, wherein the sensor coil and the at least one marker of the rotor are designed in such a way that they are coordinated with each other and arranged relative to one another so that the sensor coil acts only as a sensor coil for the indexer. As a result, a further alternative or additional design of the device according to the invention is specified. On the other hand, another advantage of this development is that the precise and robust sensor principle of inductive sensor technology is used both for the angle detector and for the indexer.

As already explained above, the indexer can be freely selected within wide, suitable limits. An advantageous development of the aforementioned embodiment of the device according to the invention provides that the extension of the at least one sensor coil of the stator of the indexer is less than or equal to a projection of the at least one vane of the rotor that is operatively connected to the stator of the indexer on a circuit board on which the at least one sensor coil is arranged. In this way, the sensitive area of the indexer is advantageously limited, so that undesired interference of the angle detector by means of the indexer or vice versa is prevented or at least effectively reduced.

A particularly advantageous development of the two last-named embodiments of the device according to the invention provides that the angle detector has a first operating frequency and the indexer has a second operating frequency, wherein the first operating frequency and the second operating frequency are different from one another. In this way, undesired interaction between the angle detector on the one hand and the indexer on the other hand is effectively prevented, despite the use of an inductive sensor for the angle detector and the indexer.

A particularly advantageous development of the inventive device provides that the at least one sensor coil of the indexer forms at least one resonant circuit with at least one capacitor connected in parallel to the respective sensor coil, wherein the resonance frequency of the respective resonant circuit can be determined by means of a resonant circuit connected to this evaluation unit. This enables a differentiation in the operating principles of the angle detector on the one hand and the indexer on the other, despite the angle detector and the indexer being designed as an inductive sensor. This is, for example, because the angle detector is based on the operating principle of inductive coupling between a transmitter coil and at least one sensor coil by means of the rotor, whereas the indexer sense a change in the resonance frequency of the respective resonant circuit by means of the rotor.

Correspondingly, an advantageous development of the method according to the invention provides that at least one resonance frequency of the at least one resonant circuit is evaluated in the evaluation unit to determine a predetermined rotation, preferably a 360° rotation, of the rotating part relative to the reference position.

An advantageous further development of the aforementioned embodiment of the device according to the invention provides that a plurality of the at least one sensor coil of the indexer forms a number of resonant circuits corresponding to said plurality of sensor coils, wherein at least one resonance frequency difference of two resonant circuits can be determined by means of the evaluation unit. In this way it is possible, for example, to at least partially compensate for the undesired influences of temperature and tolerances, such as an air gap variation. For this purpose, the plurality of sensor coils can be connected in an electrically conductive manner one after the other to the same capacitor, for example in a multiplex process. However, it is also conceivable that at least two of the sensor coils are connected together with differing capacitors to form a resonant circuit. This results in an individual resonant circuit for each individual pairing of sensor coil and capacitor, regardless of whether the multiplex process is used.

Accordingly, an advantageous development of the inventive method provides that at least one resonance frequency difference is evaluated by two resonant circuits in the evaluation unit.

In principle, the arrangement of the plurality of sensor coils can be freely selected within wide, suitable limits. An advantageous further development of the last-named embodiment of the device according to the invention provides that the plurality of sensor coils are arranged offset from one another by an angle of rotation about an axis of rotation of the rotor. In this way, for example, additional detection of the direction of rotation is made possible.

An advantageous further development of the two last-named embodiments of the device according to the invention provides that the plurality of sensor coils are arranged radially offset from one another with respect to an axis of rotation of the rotor. This enables a particularly space-saving and effective arrangement of the plurality of sensor coils relative to the rotor.

A further advantageous development of the device according to the invention, wherein the angle detector and the indexer are each at least partially arranged on a common circuit board, provides that the circuit board is designed as a multilayer printed circuit board and the angle detector is arranged on at least a first layer of the printed circuit board and the indexer on at least one second layer of the printed circuit board that is different from the first layer. This further simplifies the construction of the device according to the invention. On the other hand, the space requirement is further reduced by using a multilayer printed circuit board and the device according to the invention can be made even more compact.

An advantageous development of the last-named embodiment of the device according to the invention provides that at least one of the at least one second layer is designed as a shield. In this way, undesired interaction between the angle detector arranged at least partially on the at least one first layer and the indexer arranged at least partially on the at least one second layer is reduced or even prevented. The shield can also be designed to protect the angle detector and/or the indexer from undesired interactions with third-party components or third-party devices.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
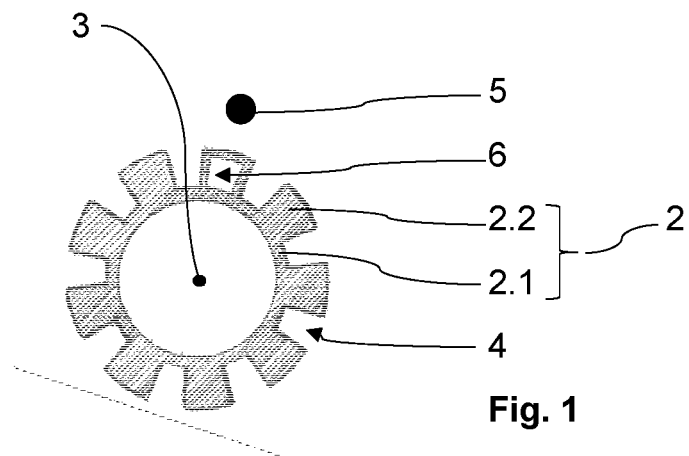
FIG. 1 shows an exemplary embodiment of the device according to the invention in a partial view, with a plan view of a rotor.

FIG. 1 shows an exemplary embodiment of a device according to the invention in a partial view. The device is designed to determine an angle of rotation and a torque of a rotating part, namely a steering shaft of a power steering system for a motor vehicle. The device comprises two angle detector, each designed as an inductive sensor, for detecting an angular position of the rotating part relative to a reference position and an indexer designed as an inductive sensor for indexing during a 360° rotation of the rotating part relative to the reference position, wherein the angle detector each have a rotor fixedly connected to the rotating part with a base body for attachment to the rotating part and a plurality of vanes extending radially outward from the base body. FIG. 1 only partially shows one of the two angle detector, namely its rotor 2, with the base body 2.1 and the vanes 2.2. The reference position is symbolized in FIG. 1 by means of a dot 5.

The rotating part, i.e. the steering shaft, is divided into two parts in a manner known to those skilled in the art, wherein one part of the steering shaft is non-rotatably connected with one of the angle detector, namely with its rotor 2, and the other part of the steering shaft is connected with the other of the angle detector, namely with its rotor. The indexer is assigned to one of the two parts of the steering shaft. The two parts of the steering shaft are connected to one another in a force-transmitting manner known to those skilled in the art by means of a torsion bar. FIG. 1 only shows the rotor 2 of the angle detector, which is associated to the same part of the steering shaft with the indexer. Each rotor 2 is made in one piece from a sheet metal suitable for inductive coupling. The rotor 2 shown in FIG. 1 has a total of nine vanes 2.2, which extend radially outward from the base body 2.1. A gap 4 is formed between the individual vanes 2.2. The vanes 2.2 are arranged uniformly around the circumference of the base body 2.1 of the rotor 2. As can be seen from FIG. 1, one of the vanes 2.2 of the rotor 2 has an opening 6 delimited by a circumferential edge. This opening 6 is a marker 6 that can be detected by means of the indexer.

The rotor of the other, not-shown angle detector has a total of eighteen vanes. This rotor has no marker detectable by means of an indexer or of the indexer, for example in the form of an opening delimited by a circumferential edge, in one of its vanes. By means of a differential angle determination known to the person skilled in the art, the torque applied to the steering shaft can be determined between the angle detector partially shown in FIG. 1 and the angle detector. The angle of rotation of the steering shaft is determined by the angle detector partially shown in FIG. 1. The indexer is used, for example, to detect angles of rotation of 360° and more. This is necessary, for example, for commercial vehicles such as trucks or the like.

Figure 2:
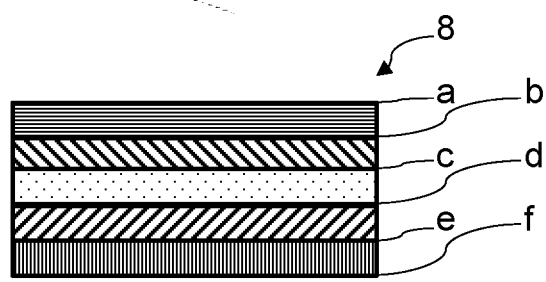
FIG. 2 is an exemplary illustration of a multilayer printed circuit board in the exemplary embodiment.
Figure 3:
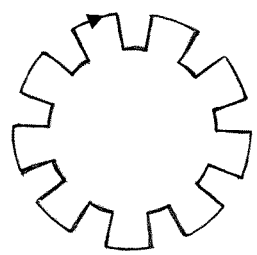
FIG. 3 shows a current flow shown by way of example.

In addition to the rotor, for example rotor 2, each of the angle detector also has a stator. The stator is constructed in a manner known to the person skilled in the art and has at least one excitation coil and at least one sensor coil. In the present exemplary embodiment, the respective stator is arranged on a single multilayer printed circuit board 8, which is shown by way of example in FIG. 2. The multilayer printed circuit board 8 has a total of six layers, which are designated in FIG. 2 by a, b, c, d, e and f. The individual layers a to f are applied to circuit board material, which is symbolized in FIG. 2 by means of different textures for the purpose of better clarity. The stator of the angle detector partially shown in FIG. 1 is arranged on layers a and b of the printed circuit board 8, and the stator of the angle detector is arranged on layers e and f of the printed circuit board 8. On the one hand, the indexer embodied as an inductive sensor is arranged on the layers c and d of the circuit board 8. On the other hand, the layers c and d of the circuit board 8 are also designed as a shield, by means of which undesired interaction between the angle detector designed as inductive sensors is at least reduced, the stators of which are arranged on the layers a and b and on the layers e and f of the circuit board 8. FIG. 2 only shows the layers a to f, but not the stators and the indexer designed as an inductive sensor.

Figure 5:
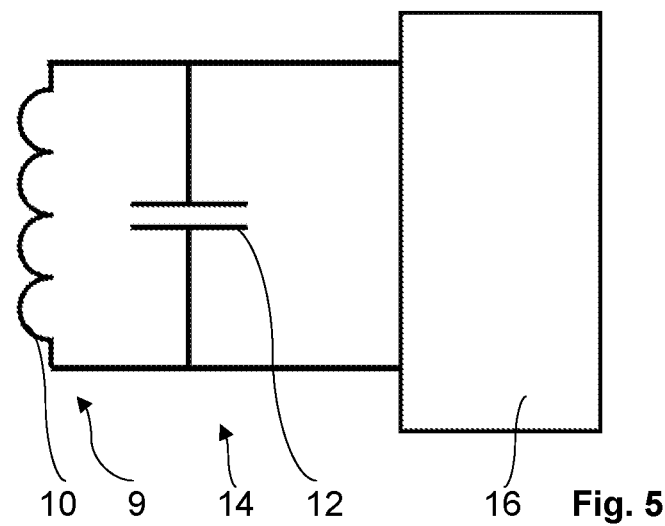
FIG. 5 shows a resonant circuit of the indexer according to the exemplary embodiments, in which the sensor coil of the indexer is integrated.
Figure 6:
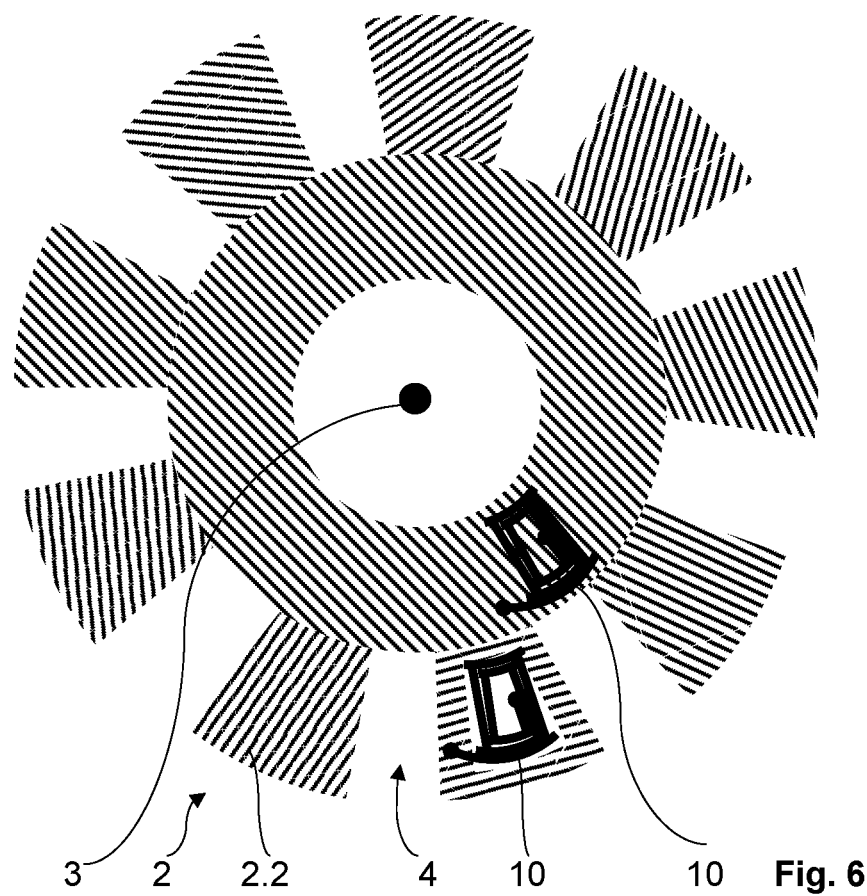
FIG. 6 shows the sensor coil from FIG. 5 in a plan view, as well as an exemplary embodiment of the device according to the invention.

The indexer formed as an inductive sensor is in each case partially shown in FIGS. 5 and 6 and has a stator 9 with a sensor coil 10, wherein the sensor coil 10 and the at least one marker 6 of the rotor 2 are formed coordinated with one another and arranged relative to each other in such a manner that the sensor coil 10 only acts as a sensor coil 10 for the indexer. The sensor coil 10 forms a resonant circuit 14 with a capacitor 12 connected in parallel to the sensor coil 10, wherein the resonance frequency of the resonant circuit 14 is able to be determined by means of an evaluation unit 16 connected to this resonant circuit 14. The evaluation unit 16 or its function can be integrated, for example, in an ASIC for evaluating output signals of the angle detector or the angle detector. However, it is also conceivable that the evaluation unit 16 is designed as a separate component. In the present exemplary embodiment, the extent of the sensor coil 10 of the stator 9 of the indexer is less than or equal to a projection of the at least one vane 2.2 of the rotor 2, which is operatively connected to the stator 9 of the indexer, on the circuit board 8 on which the sensor coil 10 is arranged. To this end, see FIG. 6, which relates to a different exemplary embodiment but is representative with regard to the aforementioned extension of the sensor coil 10. In FIG. 6, only the projection of the rotor 2 is shown on the circuit board 6, wherein the projection of the rotor 2 is provided with the reference numerals of the rotor 2. The projection is shown hatched in FIG. 6.

The device according to the invention is explained in more detail below in accordance with the first exemplary embodiment and with reference to FIGS. 1 to 5 and 7.

When the steering shaft rotates, for example due to a steering intervention by a vehicle driver of the motor vehicle, the steering shaft rotates relative to the reference position 5, so that by means of the one angle detector, which is partially shown in FIG. 1, the angle of rotation of the steering shaft can be determined in a way known to those skilled in the art. On the other hand, the two parts of the steering shaft twist towards each other, which leads to a torsion of the torsion bar, so that by determining the differential angle between the angle detected by the aforementioned angle detector and the angle detected by the not-shown angle detector in a manner known to those skilled in the art, the torque introduced in the steering shaft can be determined. When determining the angle by means of the angle detector partially shown in FIG. 1, the opening 6 arranged in one vane 2.2, i.e. the marker detectable by means of the indexer, is not a hindrance, since the current flow relevant for the inductive sensor follows the geometry shown in FIG. 3. As can be seen from this, the current flows along the outer contour of the rotor 2 shown in the image plane of FIGS. 1 and 3. The current flow required for the inductive sensor system of the two angle detector is therefore not hindered by the opening 6.

The opening 6, that is to say the marker, can be detected by means of the indexer designed as an inductive sensor. Correspondingly, the indexer can be used to detect 360° rotations of the rotating part, that is to say the steering shaft, and thus also to detect angles of rotation of the steering shaft of 360° and more. For example, this can always take place when the vane 2.2 of the rotor 2 passes the reference position 5 with the opening 6.

While the rotor 2 rotates about an axis of rotation 3 of the rotor 2 in operative connection with the indexer, the inductance in the sensor coil 10 changes, so that the resonance frequency of the resonant circuit 14 from FIG. 5 also changes. Compared to the vanes 2.2 without a marker, the vane 2.2 with the marker 6 causes an increase in the inductance in the sensor coil 10, so that in a resonance frequency-angle of rotation diagram there is a course of the resonance frequency f as a function of the angle of rotation α which is inverse to that of FIG. 7. Whenever the vane 2.2 with a marker 6 comes into the effective range of the sensor coil 10 when the rotor 2 and thus the steering shaft rotates about the axis of rotation 3, the resonance frequency f in the resonant circuit 14 drops below a certain threshold value, as shown by way of example in FIG. 7 as a dotted line parallel to the X axis. The threshold value is, for example, previously determined and stored so that in each case the present resonance frequency f of the resonant circuit 14 can be evaluated in the evaluation unit 16 in a manner known to the person skilled in the art. However, it is also conceivable that, for example, edges are counted in a specified gating interval. The resonance frequency of the resonant circuit 14 is therefore evaluated in the evaluation unit 16. Correspondingly, a complete revolution of the rotor 2 and thus the steering shaft about the common axis of rotation 3 can be determined. As a function of the detection of the marker 6 detectable by means of the indexer, a 360° rotation of the rotating part, namely the steering shaft, relative to the reference position 5 can thus be determined in the evaluation unit 16.

Further exemplary embodiments are explained below by way of example. Identical or identically acting components are provided with the same reference numbers as in the first exemplary embodiment. The following exemplary embodiments are each explained only to the extent of the differences from the respective preceding exemplary embodiments. Otherwise, reference is made to the statements of the above embodiments.

Figure 4:
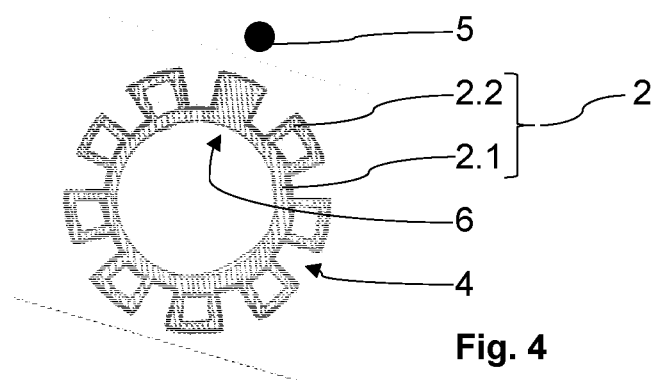
FIG. 4 shows an exemplary embodiment of the device according to the invention in a partial view, with a plan view of a rotor.
Figure 7:
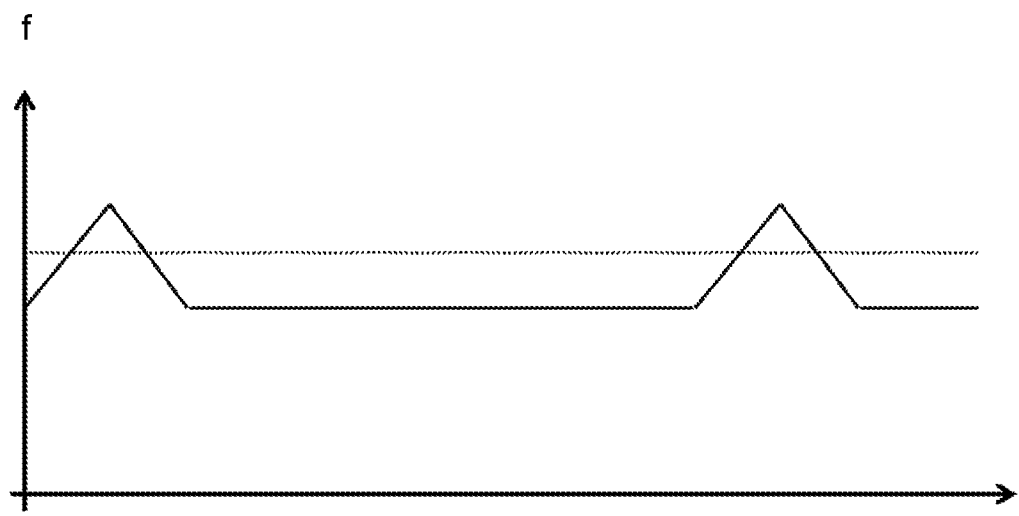
FIG. 7 shows a resonance frequency-angle of rotation diagram.

FIG. 4 shows a second embodiment of the device according to the invention. The second exemplary embodiment essentially corresponds to the first exemplary embodiment, so that reference is made to the above statements as far as possible. In contrast to the first exemplary embodiment, all of the vanes 2.2 except for a single vane 2.2 of the rotor 2 have an opening delimited by a circumferential edge. The rotor 2 of the second exemplary embodiment is thus formed inversely to the rotor 2 of the first exemplary embodiment. Correspondingly, in the second exemplary embodiment, the single vane 2.2 without an opening acts as a marker 6 detectable by means of the indexer. Otherwise, the structure and the mode of operation of the second exemplary embodiment correspond to those of the first exemplary embodiment. In contrast to the first embodiment, the second embodiment shows, for example, the course of the resonance frequency f shown in FIG. 7 as a function of the angle of rotation α of the rotor 2 and thus the steering shaft about the axis of rotation 3. As can be seen from this, the vane 2.2 without an opening, i.e. with a marker 6 designed as a closed vane 2.2, causes the inductance in the sensor coil 10 to drop, so that the course of the resonance frequency f that can be seen in the resonance frequency-angle of rotation diagram according to FIG. 7 results as a function of the angle of rotation α. Whenever the vane 2.2 with this marker 6 passes into the active region of the sensor coil 10 during a rotation of the rotor 2, and thus of the steering shaft, about the rotational axis 3, the resonance frequency f in the resonant circuit 14 rises above a certain threshold value, as shown in FIG. 7 by way of example as a dotted line parallel to the X axis. Thus, as a function of the detection of the marker 6 detectable by means of the indexer in the evaluation unit 16, a 360° rotation of the rotating part, namely the steering shaft, relative to the reference position 5 can be determined.

In the aforementioned exemplary embodiments, the angle detector and the indexer are each designed as an inductive sensor and the stator 9 of the indexer has a sensor coil 10, wherein the sensor coil 10 and the marker 6 of the rotor 2 are designed to be coordinated with one another and are arranged relative to one another in such a manner that the sensor coil 10 acts only as a sensor coil 10 for the indexer. The sensor coil 10 for the detection of the marker 6 is formed according to the first and the second embodiment in such a locally limited manner that this sensor coil 10, in contrast to at least one further non-illustrated sensor coil of each of the angle detector, has a detection area which, according to one of the above embodiments, includes only one vane 2.2.

Figure 8:
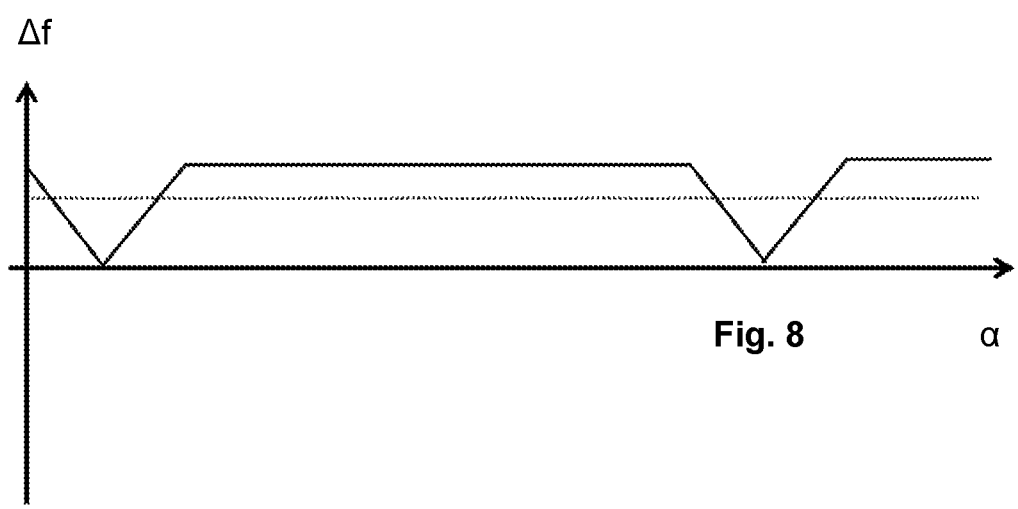
FIG. 8 shows a resonance frequency difference-angle of rotation diagram, corresponding to the first and the second embodiment.

FIG. 6 shows a third embodiment. In contrast to the first and the second exemplary embodiments, the indexer in the third exemplary embodiment has two sensor coils 10. Accordingly, there are two resonant circuits 14, wherein resonance frequency difference Δf of the two resonant circuits 14 can be determined by means of the evaluation unit 16. Each of the resonant circuits 14 is designed as shown in FIG. 5, each of the two sensor coils 10 being interconnected alternately with the capacitor 12 of the resonant circuit 14 in a multiplex process. As can be seen from FIG. 6, the two sensor coils 10 are arranged offset from one another by an angle of rotation about the axis of rotation 3 of the rotor 2. This makes it possible, for example, to additionally determine a direction of rotation of the rotor 2, and thus of the steering shaft, about its common axis of rotation 3. In addition, the sensor coils 10 are arranged radially offset from one another with respect to the axis of rotation 3 of the rotor 2. While one of the two sensor coils 10 is positioned in the radial direction analogously to the first and second exemplary embodiment, the other of the two sensor coils 10 is offset inward in the radial direction. In the third exemplary embodiment, the rotor 2 is designed analogously to the second exemplary embodiment according to FIG. 4. However, it is also conceivable that the two sensor coils are jointly dimensioned and arranged in such a way that their joint extension is less than or equal to a projection of the at least one vane of the rotor that is operatively connected to the stator of the indexer on a circuit board on which the at least one sensor coil is arranged. By means of the two sensor coils 10 of the indexer according to the third embodiment, a resonance frequency difference $\Delta f$ of two resonant circuits 14 can be determined by means of the evaluation unit 16. This is advantageous, for example, for preventing or at least effectively reducing undesired influences of temperature and tolerances. In contrast to the first and second embodiment, in the evaluation unit 16 of the third embodiment, the resonance frequency difference $\Delta f$ between the two resonant circuits 14 is evaluated, namely on the one hand between the resonant circuit 14 formed by means of the one sensor coil 10 and the capacitor 12, and on the other, between the resonant circuit 14 formed by means of the other sensor coil 10 and the capacitor 12. The corresponding course of the resonance frequency difference as a function of the angle of rotation $\alpha$ can be seen in FIG. 8 in a manner analogous to FIG. 7.

The invention is not limited to the present exemplary embodiments. For example, the angle of rotation and/or torque of other rotating parts can also be advantageously determined by means of the device according to the invention. Instead of detecting the angle of rotation and the torque, it is possible to detect only the angle of rotation or the torque. The invention can also be used in other fields of application apart from the automotive industry.

As already explained, the at least one angle detector and the at least one indexer can be freely selected within wide, suitable limits. This also applies to the sensor principle used. The at least one angle detector is preferably designed as an inductive and/or capacitive and/or magnetic and/or optical sensor. The same applies to the at least one indexer. Accordingly, various combinations of sensor principles can be used simultaneously, for example for a plurality of angle detector and/or a plurality of indexer.

For example, it is conceivable that a single vane extends radially further outward from the base body than the other vanes into a detection area of the indexer, or that all vanes except for a single vane extend radially further from the base body than the single vane into a detection area of the indexer. In this case, the angle detector can be designed as an inductive sensor and the indexer as an optical sensor, and a single vane can extend further radially outward from the basic body than all the other vanes or all vanes except for one single vane can extend radially further outward from the base body than the single vane. For example, the optical sensor could be arranged offset radially outward relative to the rotor in such a way that the optical sensor can detect the marker detectable by means of the optical sensor, that is to say, the only longer or the only shorter vane of the rotor.

It is particularly advantageous that the angle detector has a first operating frequency and the indexer has a second operating frequency, wherein the first operating frequency and the second operating frequency are different from each other. For example, the first operating frequency could be 3-4 MHz and the second operating frequency could be 6-8 MHz. Due to the significant deviation of the first from the second operating frequency, undesired interaction between the two inductive sensors would be effectively prevented. This development of the arrangement according to the invention could also be used advantageously in the case of a plurality of inductive angle detector, as in the present exemplary embodiments.

The components of the at least one angle detector and of the at least one indexer do not necessarily have to be arranged at least partially on a single printed circuit board, in particular a multilayer printed circuit board. Depending on the requirements of the individual case, the components of the at least one angle detector and of the at least one indexer can also be arranged on printed circuit boards or the like which are different from one another, in one or more layers.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for determining an angle of rotation and/or a torque of a rotating part, the device comprising:
   at least one angle detector to detect an angular position of the rotating part relative to a reference position; and
   at least one indexer to index at a predetermined rotation or a 360° rotation of the rotating part relative to the reference position,
   wherein the at least one angle detector comprises a rotor fixedly connected with the rotating part, the rotor having a base body for attachment to the rotating part and vanes extending radially outward from the base body,
   wherein the rotor has a marker that is detectable via the at least one indexer, and
   wherein the at least one angle detector is designed as an inductive sensor and the at least one indexer is designed as a capacitive sensor, or, the at least one angle detector is designed as a capacitive sensor and the at least one indexer is designed as an inductive sensor.

2. The device according to claim 1, wherein a single one of the vanes of the rotor has the marker which is detectable via the at least one indexer.

3. The device according to claim 1, wherein, in a detection area of the at least one indexer, a single one of the vanes has an opening that is delimited by a circumferential edge, the opening being the marker that is detectable via the at least one indexer, or, all of the vanes except for a single one of the vanes have an opening that is delimited by a circumferential edge, such that the single one of the vanes without the opening is the marker that is detectable via the at least one indexer.

4. The device according to claim 1, wherein a single one of the vanes extends radially further outward from the base body, than the other vanes, into a detection area of the at least one indexer, such that the single one of the vanes that extends radially further outward from the base body is the marker that is detectable via the at least one indexer, or, all of the vanes except for a single one of the vanes extend further radially outward from the base body into a detection area of the at least one indexer, such that the single one of the vanes that does not extend further radially outward from the base body is the marker that is detectable via the at least one indexer.

5. The device according to claim 1, wherein the at least one angle detector and the at least one indexer are each arranged at least partially on a common printed circuit board, wherein the common printed circuit board is designed as a multilayer circuit board and the at least one angle detector is arranged on at least one first layer of the multilayer circuit board and the at least one indexer is arranged on at least one of the second layer of the multilayer circuit board that is different from the at least one first layer.

6. The device according to claim 5, wherein the at least one second layer is designed as a shield.

7. A method comprising:
   providing a device according to claim 1; and
   determining in an evaluation unit, as a function of the detection of the marker detectable via the at least one indexer, a 360° rotation of the rotating part relative to the reference position.

8. The method according to claim 7, wherein, in order to determine the 360° rotation of the rotating part relative to the reference position, at least one resonance frequency of at least one resonant circuit is evaluated in the evaluation unit.

9. The method according to claim 8, wherein the at least one resonant circuit includes two resonant circuits and wherein at least one resonance frequency difference of the two resonant circuits is evaluated in the evaluation unit.

10. The device according to claim 3, wherein the opening of the single one of the vanes is a through-hole or the opening of all of the vanes except for the single one of the vanes are through-holes.

* * * * *